April 11, 1961
W. E. McBRIDE
2,979,200
EGG GRADER
Filed May 22, 1958
3 Sheets-Sheet 1
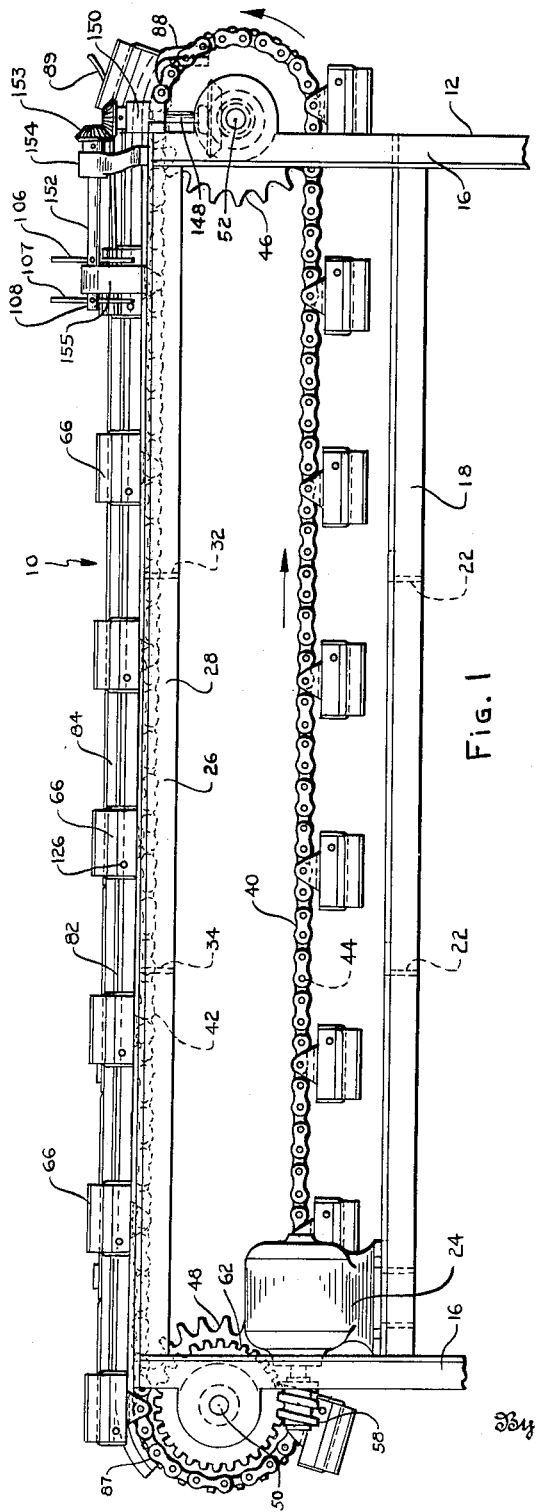
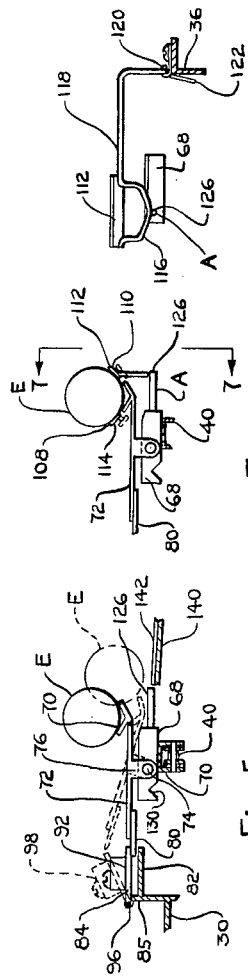
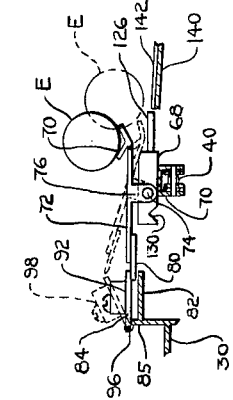
Inventor
William E. Mcbride
By Walter S. Pawl
Attorney April 11, 1961  W. E. McBRIDE  2,979,200
EGG GRADER
Filed May 22, 1958  3 Sheets-Sheet 3

Inventor
William E. Mcbride

By Walter S. Pawl
Attorney

United States Patent Office 2,979,200
Patented Apr. 11, 1961

2,979,200
EGG GRADER
William E. McBride, R.D. 2, E. Lake Road,
Woodstown, N.J.
Filed May 22, 1958, Ser. No. 737,163
19 Claims. (Cl. 209—121)

This invention relates to equipment for grading eggs, and more particularly to a machine for grading eggs by weight.

An object of the present invention is to provide a machine for grading eggs rapidly and without breakage, the eggs being separated into discrete quantities or groups with the weight of eggs in each group being essentially the same. In the practice of the invention I have provided a machine which accepts the eggs and holds them individually in a pocket until they are transported to a series of weighing stations. There are means at each station for sensing the weight of the individual eggs and delivering the eggs to a remote location, for instance on the surface of a table, with the eggs caused to roll down a very gentle incline to become part of the group with which the eggs belong in accordance with the weight of the eggs.

The portion of the machine which handles the eggs does so comparatively quickly and gently. This portion of the machine is considered unique in its structural organization and mode of operation.

The machine has an egg receiving chute that delivers the egg to the egg receiving station and holds the egg in a position on a holder to be accepted by an egg cradle that is one of a group of egg cradles on an endless conveyor. There are means connected with the egg cradle structure for lifting the egg holder at the egg receiving station for an instant to receive the egg when it is deposited on the egg holder and then these same means enable the egg holder to be lowered in proper timed sequence with the egg cradle on the endless conveyor so that the egg is deposited in the cradle. Thereafter the egg is moved along a rectilinear path as caused by the movement of the endless conveyor. The next step is to have the egg cradle with the egg on it subjected to successive weighing operations. When the weight of the egg is sufficient to trip a hinged weight member of the machine, the egg is gently rolled down an inclined surface to be received in one of the previously mentioned groups and become a part thereof. The cradle on the endless conveyor is made of a lever pivotally carried by a structural, small assembly on the conveyor whereby the discharge of the egg from the cradle is occasioned by way of the lever tilting to unload the egg.

One of the features of the invention is the general, structural organization of the machine. The combination of parts and arrangement of details provides a new, smoothly operative and quick acting machine that is both dependable and subject to little or no failure, requiring practically no maintenance even when used over extended periods.

Other objects and features of importance will become apparent in following the description of the illustrated form of the invention. The illustrated machine shows only one possible configuration of the invention and is shown merely to illustrate the principles of the invention.

Fig. 1 is a side elevational view of a machine constructed in accordance with the invention.

Fig. 5 is an enlarged fragmentary sectional view taken on the line 5—5 of Fig. 2 and showing an egg in the process of being discharged by a dotted line second position representation.

Fig. 6 is a schematic view as would be seen approximately on the line 6—6 of Fig. 2 and showing particularly an egg in the egg receiving station after having been deposited there by the egg feed wheel of the machine and prior to extraction of the egg from the station by the movable egg cradle typifying the indefinite number of such cradles on the endless conveyor of the machine.

Fig. 7 is a view as would be seen when viewing along the line 7—7 of Fig. 6 but with the egg and other structure removed.

Figure 2:
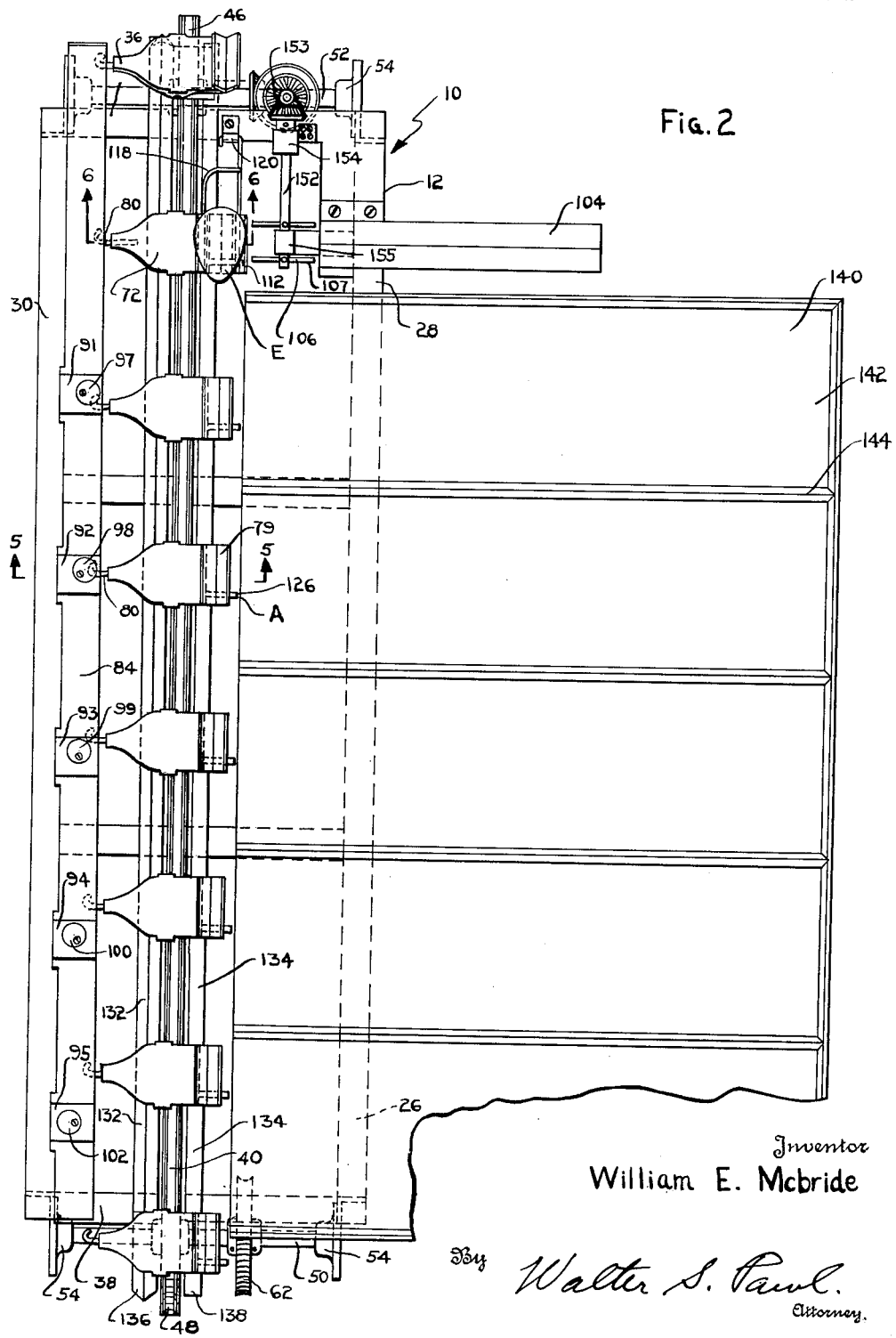
Fig. 2 is a top view of the machine in Fig. 1, this view showing the machine as it would appear in operation and used with the egg receiving table.
Figure 3:
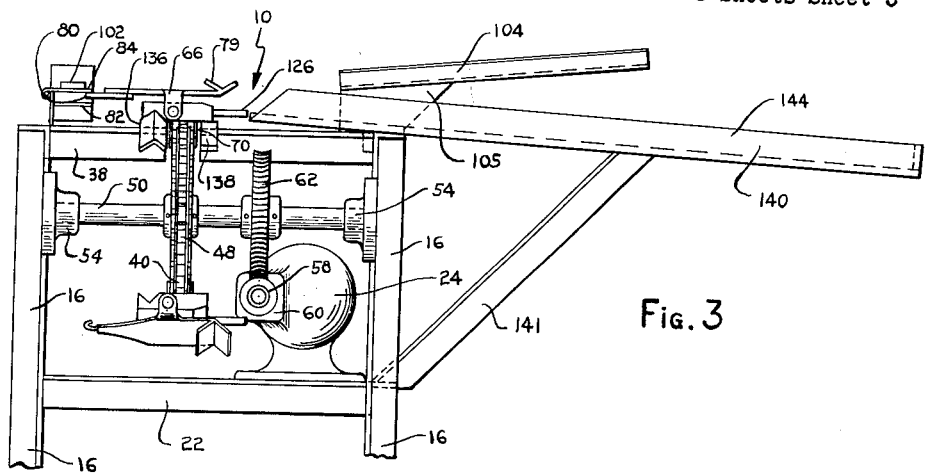
Fig. 3 is an end view of the machine of Fig. 2.

In the accompanying drawings there is an egg grading machine 10 that exemplifies the invention. The machine has a frame 12 made of structural members joined together to serve a support function. The actual organization of frame members can be varied depending on the desires of the manufacturer in making up the machine. In the illustration there are a plurality of legs 16 to which an intermediate sub-frame 18 is fixed. The sub-frame has longitudinal sides and transverse braces 22 joined together. The sub-frame not only provides strength and rigidity in the frame but it also supports an electric motor 24 that is fitted with standard controls. An upper sub-frame 26 is secured to the legs 16 and it, too, is made of sides and cross members. The sides 28 and 30 have transverse cross members 32 and 34 fixed to them intermediate the ends. End cross members 36 and 38 complete the illustrated main frame 12.

Endless conveyor 40 has an upper flight 42 and a lower flight 44, and is preferably of chain link construction. One end of the conveyor is mounted on sprocket 46 while the other end is entrained around sprocket 48. The sprockets are secured to shafts 50 and 52, respectively, that are carried in bearings 54 at the ends of the main frame of the machine. Shaft 50 is the drive shaft for the endless conveyor. The drive train consists of a worm 58 driven by motor 24 through transfer mechanism 60 on the motor. Worm wheel 62 is secured to shaft 50 and in engagement with worm 58 thereby establishing a driving connection between the motor 24 and the endless conveyor 40.

A plurality of egg holders 66 are attached at spaced places on the endless conveyor. Each is of identical construction (Figs. 5 and 6), consisting of a small body 68 attached to the conveyor chain, for example by mounting bracket 70 that depends from the small body. A structural member such as plate 72, is pivoted by pin 74 to the small body 68. Depending ears 76 on plate 72 accommodate pin 74 between the ends of the plate thereby mounting the plate as a second class lever and capable of tilting between the egg transporting and egg discharging positions as shown in full line and dotted line positions respectively in Fig. 5. The egg holder has a cradle 79 at one end within which to support egg E. Cradle 79 is essentially V-shaped, although some other shape may be adopted, and supports only a small part of the periphery of the egg so that it can easily roll off the cradle as shown by the dotted line egg E of Fig. 5. The opposite end of the pivoted plate 72 has a weight engaging member 80 made in the form of a small hook that functions as a cam so that there will be no sharp projecting end to interfere with normal operation of the conveyor.

Side 30 of the upper sub-frame has a pair of rails 82 and 84 attached to it and projecting inwardly toward the central longitudinal axis of the upper sub-frame. These spaced rails constitute track 85 within which weight engaging members 80 are adapted to slide. Rail 82 is flat, continuous and unbroken from end-to-end, and the end portions 87 and 88 are turned down (Fig. 1) to form guides over which the weight engaging members 80 can operate. The upper rail 84 is discontinuous (Fig. 2) and has an upturned end 89 that functions as a cam to further help in guiding the weight engaging members 80 into the track 85. Upper rail 84 is discontinuous in the sense that there are a number of weight supporting members 91, 92, 93, 94 and 95 each connected by a hinge 96 at its outer edge to a short upstanding part of the track between the upper and lower rails 84 and 82 thereof. The members 91, 92, 93, 94 and 95 are normally held coplanar with rail 84 by abutting an edge of the track (Fig. 5). Each member has a weight 97, 98, 99, 100 and 102, respectively, adjustably attached to it. It is preferred that the weights be made of small eccentrics held in place by screws or bolts that can be loosed and tightened after the weight is rotated to the desired position. By shifting the weights in this way, the weighing scales constructed by the weights and their hinged member are adjusted to hingedly lift at a specific weight level for egg E that is being weighed.

An egg inlet chute 104 is attached by bracket 105 to the upper sub-frame side 28 and preferably at one side of the entire machine. Eggs are manually or otherwise fed down chute 104 (Fig. 4) and they are individually accepted in the egg feed wheel 106 and deposited in the egg receiving station 108 of the machine. Therefore, the egg receiving chute has slightly angled bottom walls to constrain the travel of the eggs as they are gravitationally moved toward the feed wheel 106. The feed wheel has a number of radial spokes forming 107 outwardly opening pockets that accept one egg at a time and convey it into the egg receiving station 108.

Egg receiving station 108 is provided with an egg support 110 (Figs. 6 and 7) that is capable of moving up and down a limited distance to present the egg to the egg holder at the station 108 at the time that the egg is ready for transfer from station 108 to an egg cradle on the endless conveyor. The egg support 110 has two support members 112 and 114 arranged at an angle to each other to form a support for egg E of Fig. 6. A small rod or wire frame 116 suspended from the member 112 has a cantilever rod 118 extending therefrom, a branch of the cantilever rod 118 extending also to the member 114. Hinge 120 mounts the cantilever rod 118 on end frame member 36. The downward movement of the rod 118 and hence, the egg support of Fig. 6 can move downward only a limited amount because of stop 122. This stop can be a part of or attached to rod 118 and abuts a surface of frame member 36 to limit the downward hinged movement of the egg support which is actually the bottom of the egg receiving station 108. The base of the U formed by the branches of the rod 118 does not move down to the level of the cradle 79, because this portion of the rod 118 is obviously made to arch over this level at all times so as not to interfere with the cradles 79 passing under it. The operation of this feature of the invention is shown in Figs. 6 and 7. As the small body 68 of the egg holder enters the station 108 a lift pin 126 that protrudes laterally from the body 68, rides under the cam surface formed by frame 116. The timing of the machine is such that when the pin 126 engages the deepest part of frame 116 (Fig. 7) the egg feed wheel 106 has already deposited an egg on the members 112 and 114. As soon as the body 68 moves slightly further in its travel, pin 126 moves from beneath the highest part of the cam that is formed by frame 116 allowing it to be gravitationally lowered to the extent that stop 122 will permit. This lowering is accompanied by acceptance of the egg E in the cradle 79 which, at this moment in the operation of the machine, is located centrally under the egg.

In order to assure proper longitudinal and transverse alignment of each egg holder and the egg support in the egg receiving station 108 and actually, for the entire progress of the typical egg holder 66, body 68 has a downwardly opening V-shaped notch 130 that nests over a V-shaped rail 132 which extends the full length of the upper sub-frame. Each egg holder is also supported by a flat rail 134 that is parallel to the V-shaped rail 132. The ends 136 and 138, respectively, of the egg holder supporting rails 132 and 134 are turned down so that the egg holders smoothly cam over both ends of each of these rails.

After acceptance of eggs E into holders 66, the egg holders are moved from the egg receiving station 108 to the successive egg weighing stations that are successively disposed on the upper sub-frame of the machine, as described previously. The station having weight 97 adjusted for the heaviest weight eggs will permit the heaviest eggs to be discharged by the tilting that was described previously and that is illustrated graphically in Fig. 5. The next heaviest eggs are discharged at the next station and this procedure is repeated until all eggs are graded in this way. When the eggs are discharged they roll on the surface of table 140 located on the same side of the machine as the egg inlet chute 104. The table is supported on legs or preferably attached by braces 141 to frame 12, and has an essentially flat top surface but it is arranged at a slight angle so that the eggs roll down the table. The top surface of the table has a resilient mat 142 to prevent damage to the eggs, and there are fences 144 that rise from the top surface of the table and prevent the eggs from becoming commingled. The eggs are, therefore, kept in discrete groups on the table.

The description of the egg handling aspect of the machine shows the necessity of reasonably accurate timing. Therefore the timing of the wheel 106 is cared for by the use of shaft 52 as a drive shaft. Bevel gears 146 (Fig. 4) drivingly connect shaft 148 to the shaft 52 of the conveyor. Shaft 148 is mounted for rotation in one or more bearings 150 that are carried by the end frame member 36. Bevel gears 153 connect shaft 152 to shaft 148, shaft 152 being supported by bearings 154 and 155 attached to the upper sub-frame and located above its general surface. Wheel 106 has portions on opposite sides of shaft supporting bearing 155. In this way the egg receiving portion of the machine must always be in time with the egg holders of the conveyor 40.

Figure 4:
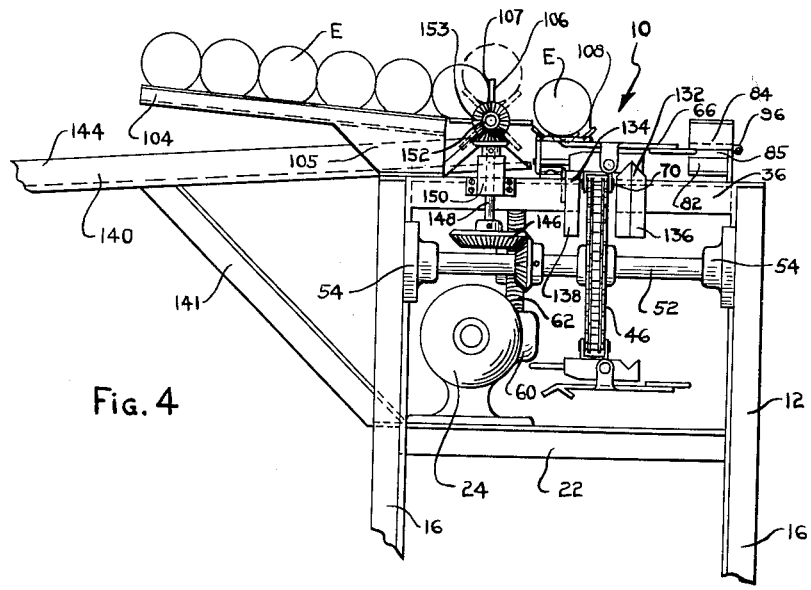
Fig. 4 is an end view of the machine in Fig. 2, but showing the end of the machine opposite to that shown in Fig. 3.

To recapitulate, the eggs are fed down chute 104 and they are gravity lowered in a line as shown in Fig. 4. Assuming the motor 24 to be energized, the endless conveyor 40 has its upper and lower flights moving in the direction of the arrow shown in Fig. 1. The egg holders 66 successively enter station 108 with pin 126 lifting the egg support members 112 and 114 upwardly to lift the individual eggs that have been presented thereon from the pockets of wheel 106 over the cradle 79. As the pin 126 of a typical egg holder moves slightly farther in its travel, the members 112 and 114 are lowered thereby lowering the egg onto the cradle 79 of the egg holder.

Then the egg holder is moved to the successive weighing stations enabling the eggs to be discharged into the discrete groups of eggs held separate by the fences 144 on the table 140. Once the machine is set into motion and eggs are fed down chute 104, the eggs will continue to be graded without interruption to the continuous operation of the machine.

It is understood that various changes and modifications may be made herein without departing from the invention as claimed. Accordingly, all modifications, alternatives, etc. that fall within the purview of the following claims may be resorted to.

What is claimed is:

1. In an egg grading machine, the combination of a frame, an endless chain having an upper flight and a lower flight of links connected by pins, a pair of shafts, means including said shafts supporting said endless chain on said frame, a plurality of spaced egg holders attached to the chain each egg holder having a body pinned to the outer ends of a link pin, a pivoted lever on said body and having a cradle at one end on which the eggs are adapted to be deposited, means constraining the pivotal movement of said pivoted lever and located at the opposite end of said pivoted lever, said constraining means including a pair of upper and lower rails attached to said frame along the side of the upper flight of links, said opposite end of said pivoted lever being disposed between said rails, the upper rail being of stiff sheet material and having separate adjustably weighted portions hinged at spaced weighing stations said portions having eccentrically mounted weight discs on top for adjustment of the spacings of their centers of gravity in front of their hinges in accordance with the desired egg gradings at the successive stations, said portions being adapted to be swung upwardly by said pivoted lever when an egg of a predetermined weight is on said cradle thereby tilting the cradle and discharging the egg from said cradle.

2. In an egg grading machine, the combination of a frame, an endless chain having an upper flight and a lower flight of links connected by pins, a pair of shafts, means including said shafts supporting said endless chain on said frame, a plurality of spaced egg holders attached to the chain each egg holder having a body pinned to the outer end of a link pin, a pivoted lever on said body and having a cradle at one end on which the eggs are adapted to be deposited, means constraining the pivotal movement of said pivoted lever and located at the opposite end of said pivoted lever, said constraining means including a pair of upper and lower rails attached to said frame along the side of the upper flight of links, said opposite end of said pivoted lever being disposed between said rails, the upper rail having spaced weighing stations with hinged adjustable weights that are adapted to be swung upwardly by said pivoted lever when an egg of a predetermined weight is on said cradle thereby tilting the cradle and discharging the egg from said cradle, said frame having an egg receiving station, said station having an egg support, means hingedly mounting said egg support on said frame, means carried by said frame and located adjacent to said egg support for depositing individual eggs on said egg support, and means connected with each egg holder and cooperable with said egg support to hingedly raise said egg over said cradle as said egg holder moves by and to lower the egg support for depositing the egg into said egg cradle of said egg holder.

3. The combination of claim 2, wherein there is a stop operatively connected with said egg support to limit the lowering of said egg support.

4. The combination of claim 2, wherein each egg holder has a pin that constitutes a portion of said means for raising said egg support, said pins of said egg holders projecting from said egg holders and actuating a cam part of said support to lift said support.

5. The combination of claim 4, guide means carried by said frame alongside said upper flight and coacting with said bodies of said egg holders for levelling said egg holders and cam actuating pins.

6. The combination of claim 5, wherein each weighing station consists essentially of an eccentric weight member, and a hinged member carried by said frame and to which said eccentric member is adjustably secured, said hinged member forming a portion of said upper rail.

7. In an egg grading machine that has a frame, an endless conveyor carried by said frame, a plurality of spaced egg holders with egg cradle on said conveyor, an egg receiving station adjacent to the receiving end of said conveyor and including an egg feed wheel, means for actuating said wheel and said conveyor in timed relationship to each other, an egg support including an egg support member, means hingedly mounting said egg support member on said frame, and means connected with each egg holder for raising said egg support member from the egg accepting position with respect to said wheel up to a level to clear each egg cradle as said egg holders are moved to said station and for lowering the egg to said cradle as said cradle passes under said egg.

8. In an egg grading machine that has a frame, an endless conveyor carried by said frame, a plurality of spaced egg holders on said conveyor, an egg receiving station adjacent to said conveyor and including an egg feed wheel, means for actuating said wheel and said conveyor in timed relationship to each other, an egg support including an egg support member, means hingedly mounting said egg support member on said frame, and means connected with each egg holder for raising said egg support member to lift the egg over the passing holder as said egg holder is moved through said station, said egg support raising means adapted to separate from said support to enable said support to be gravitationally lowered, each egg holder having a lever pivoted intermediate its ends and carried by said conveyor, an egg cradle at one end of said lever and adapted to move under said support and receive an egg from the support when said support is gravitationally lowered.

9. In an egg grading machine that has a frame, an endless conveyor carried by said frame, a plurality of spaced egg holders on said conveyor, an egg receiving station adjacent to said conveyor and including an egg feed wheel, means for actuating said wheel and said conveyor in timed relationship to each other, an egg support including an egg support member, means hingedly mounting said egg support member on said frame, and means connected with each egg holder for raising said egg support member to lift the egg over the passing holder as said egg holder is moved through said station, said egg support raising means adapted to separate from said support to enable said support to be gravitationally lowered, each egg holder having a lever pivoted intermediate its ends and carried by said conveyor, an egg cradle at one end of said lever and adapted to move under said support and receive an egg from the support when said support is gravitationally lowered, a rail connected with said frame and approximately parallel to the upper flight of said conveyor, weighing stations operatively associated with said rail to weigh the eggs on said egg holders and release said egg holders for pivotal egg discharging movement when the egg carried by the holders is of a predetermined weight.

10. In an egg grading machine that has a frame, an endless conveyor carried by said frame, a plurality of spaced egg holders on said conveyor, an egg receiving station adjacent to said conveyor and including an egg feed wheel, means for actuating said wheel and said conveyor in timed relationship to each other, an egg support including an egg support member, means hingedly mounting said egg support member on said frame, and means connected with each egg holder for raising said egg support member to lift the egg over the passing holder as said egg holder is moved through said station, said egg support raising means adapted to separate from said support to enable said support to be gravitationally lowered, each egg holder having a lever pivoted intermediate its ends and carried by said conveyor, an egg cradle at one end of said lever and adapted to move under said support and receive an egg from the support when said support is gravitationally lowered, a rail connected with said frame and approximately parallel to the upper flight of said conveyor, weighing stations operatively associated with said rail to weigh the eggs on said egg holders and release said egg holders for pivotal egg discharging movement when the egg carried by the holders is of a predetermined weight, said means associated with said rail comprising a plurality of hinged members, each hinge member having a weight thereon whose mass is adapted to be overcome by the lever action of said pivoted lever and the egg thereon so that the weight of the egg pivotally operates said lever.

11. In an egg grading machine, a frame, a conveyor carried by said frame, a plurality of spaced egg holders on said conveyor, an egg receiving station having an egg support therein, means hingedly mounting said egg support on said frame, a pin carried by each egg holder and engageable with a cam on said egg support to raise and lower said egg support for each movement of each egg holder through said station, each egg holder having an egg cradle on which the egg is deposited in said station when said egg holder is lowered.

12. In an egg grading machine, a frame, a conveyor carried by said frame, a plurality of spaced egg holders on said conveyor, an egg receiving station having an egg support therein, means hingedly mounting said egg support on said frame, a pin carried by each egg holder and engageable with a cam on said egg support to raise and lower said egg support for each movement of each egg holder through said station, each egg holder having an egg cradle on which the egg is deposited in said station when said egg holder is lowered, means operatively connected with said egg support for limiting the lowering of said egg support, and a plurality of spaced weighing stations through which said egg holders are successively passed after passing through said egg receiving station.

13. In an egg grading machine, a frame, a conveyor carried by said frame, a plurality of spaced egg holders on said conveyor, an egg receiving station having an egg support therein, means hingedly mounting said egg support on said frame, a pin carried by each egg holder and engageable with a cam on said egg support to raise and lower said egg support for each movement of each egg holder through said station, each egg holder having an egg cradle on which the egg is deposited in said station when said egg holder is lowered, a pair of vertically spaced rails carried by said frame and constituting a track, each egg holder having a pivoted lever with said cradle on one end and an opposite end located in said track between said spaced rails, adjustable weight means hinged in said upper rail and contacted by said opposite ends of said pivoted levers and opposing the pivotal movement in one direction of said pivoted levers so that when the weight of the egg exceeds adjusted weight said pivoted lever is pivotally actuated to unload the egg from said egg cradle.

14. The machine of claim 13, wherein there is a table alongside of said frame and at the discharge end of each cradle, means separating said table into compartments so that the eggs that are discharged from said egg holder are maintained in discrete groups on said table.

15. The machine of claim 13, wherein said rails have curved end portions to constrain the travel of said opposite ends of said pivoted levers as they move into the space between said rails.

16. In an egg grading machine which has a frame, a conveyor, a plurality of egg holders on said conveyor, means for successively delivering eggs to the receiving end of said conveyor and in timed sequence to the movement of said egg holders, the improvement comprising an egg support at said receiving end, said egg support having a cam thereon, means including a hinge connecting said support and cam to said frame so that the support is hingedly raisable, means connected with each egg holder and adapted to contact said cam to momentarily raise said egg support upon the approach of an egg holder, each egg holder having an egg cradle on which the egg is deposited from said holder when said holder is hingedly lowered.

17. In an egg grading machine which has a frame, a conveyor, a plurality of egg holders on said conveyor, means for successively delivering eggs to the receiving end of said conveyor and in timed sequence to the movement of said egg holders, the improvement comprising an egg support at said receiving end, said egg support having a cam thereon, means including a hinge connecting to said support and cam to said frame so that the support is hingedly raisable, means connected with each egg holder and adapted to contact said cam to momentarily raise said egg support upon the approach of an egg holder, each egg holder having an egg cradle on which the egg is deposited from said holder when said holder is hingedly lowered, means at successive stations on said frame and successively engageable with said egg holder for weighing the egg on said egg holder and for discharging the egg from the egg holder when the egg on the holder is of a predetermined weight.

18. In an egg grading machine which has a frame, a conveyor, a plurality of egg holders on said conveyor, means for successively delivering eggs to the receiving end of said conveyor and in timed sequence to the movement of said egg holders, the improvement comprising an egg support at said receiving end, said egg support having a cam thereon, means including a hinge connecting said support and cam to said frame so that the support is hingedly raisable, means connected with each egg holder and adapted to contact said cam to momentarily raise said egg support upon the approach of an egg holder, each egg holder having an egg cradle on which the egg is deposited from said holder when said holder is hingedly lowered, means at successive stations on said frame and successively engageable with said egg holder for weighing the egg on said egg holder when the egg on the holder is of a predetermined weight, means carried by said frame and engageable with each egg holder for constraining the travel of said egg holders as they move into said successive stations.

19. In a machine for grading eggs by the weight of the individual eggs, the combination of a frame, a plurality of weighing stations successively disposed on said frame, each weighing station having a weight, means hingedly mounting said weight on the frame, a rail having spaced portions and carried by said frame, said weight mounting means disposed in the spaces of said rail, a conveyor, egg holders on said conveyor, each egg holder having a body attached to said conveyor, a horizontal lever plate pivoted between its ends on said body, one end of said plate being in slidable contact under said rail and said weight mounting means as said conveyor is moved, a cradle at the opposite end of said pivoted plate and within which to accommodate an egg so that when the weight of the egg exceeds said hinged weight the latter is raised so that said pivoted plate is pivotally actuated to discharge the egg from said cradle, guide means on said frame for leveling said bodies of said egg holders, an egg receiving station, an egg support at the receiving end of said conveyor, means hingedly mounting said egg support on said frame, means for stopping said egg support in a down position for receiving the egg, said egg support being raisable as said egg holders approach it, said cradle of said egg holders being located beneath said egg support when said egg support is hingedly returned to its down position so that the egg on said egg support is deposited on said cradle, and means operatively connected with said conveyor for actuating said conveyor in timed sequence to the depositing of the eggs onto said egg support.

References Cited in the file of this patent

UNITED STATES PATENTS

| | | |
|---|---|---|
| 1,219,056 | Tussing | Mar. 13, 1917 |
| 1,884,999 | White et al. | Oct. 25, 1932 |
| 2,112,324 | Arbron | Mar. 29, 1938 |
| 2,138,475 | Hilton | Nov. 29, 1938 |
| 2,261,303 | Smith | Nov. 4, 1941 |
| 2,355,715 | Edington | Aug. 15, 1944 |
| 2,833,408 | Norris et al. | May 6, 1958 |

FOREIGN PATENTS

| | | |
|---|---|---|
| 468,838 | Great Britain | July 13, 1937 |
| 653,622 | Germany | Nov. 29, 1937 |
| 55,091 | Denmark | Aug. 15, 1938 |